(12) United States Patent
Schmidt et al.

(10) Patent No.: US 7,591,620 B2
(45) Date of Patent: Sep. 22, 2009

(54) MILLING AND DRILLING MACHINE

(75) Inventors: Klaus Schmidt, Seebach (DE); Ines Prautzsch, Tabarz (DE)

(73) Assignee: DECKEL MAHO Seebach GmbH, Seebach (DE)

( * ) Notice: Subject to any disclaimer, the term of this patent is extended or adjusted under 35 U.S.C. 154(b) by 155 days.

(21) Appl. No.: 11/781,496

(22) Filed: Jul. 23, 2007

(65) Prior Publication Data
US 2008/0175684 A1    Jul. 24, 2008

(30) Foreign Application Priority Data
Jul. 24, 2006    (DE) .................. 10 2006 034 123

(51) Int. Cl.
B23C 1/06    (2006.01)
B23C 1/14    (2006.01)
B23Q 5/28    (2006.01)
(52) U.S. Cl. .................. 409/235; 409/212; 409/137; 409/165; 409/167
(58) Field of Classification Search .................. 409/202, 409/212, 235, 137, 145, 159, 163, 165, 167, 409/172; 29/26 A; 408/234
See application file for complete search history.

(56) References Cited

U.S. PATENT DOCUMENTS

2005/0008441 A1 *  1/2005  Wakazono et al. .......... 409/235
2006/0008335 A1 *  1/2006  Furuhashi et al. .......... 409/202
2006/0048361 A1 *  3/2006  Corbean et al. ............ 409/202
2009/0067944 A1 *  3/2009  Motta et al. ............... 409/202

FOREIGN PATENT DOCUMENTS

| DE | 10049810 B4 | 7/2004 |
| DE | 10259215 A1 | 7/2004 |
| DE | 102004034873 B3 | 9/2005 |
| DE | 102004052516 A1 * | 4/2006 |
| DE | 202004019478 U1 | 5/2006 |
| DE | 102005041031 A1 | 3/2007 |
| EP | 0712682 A2 | 5/1996 |
| JP | 2004299040 A * | 10/2004 |
| WO | WO2006/072356 A1 | 7/2006 |

OTHER PUBLICATIONS

EPO Search Report, dated Oct. 4, 2007, for corresponding application.

* cited by examiner

Primary Examiner—Erica E Cadugan
(74) Attorney, Agent, or Firm—The Maxham Firm

(57) ABSTRACT

A milling and drilling machine comprising a rigid machine tool frame comprising an upper cross girth, a machining unit movable on the front side of the cross girth along at least two coordinate axes by means of a motor and including a rotationally driven work spindle including exchangeable tools, and a workpiece table which is disposed in front of the machine tool frame and horizontally movable along at least one coordinate axis by means of a motor and comprises a tabletop for clamping at least one workpiece. The machine tool frame comprises two rigid side walls rigidly connected to each other by the upper crossbar and a front end.

6 Claims, 3 Drawing Sheets

MILLING AND DRILLING MACHINE

FIELD OF THE INVENTION

The invention relates generally to milling and drilling machines, and more particularly to such a machine comprising a rigid machine tool frame comprising two parallel side walls and an upper crossbar fastened to the two side walls with a machining unit movable along at least two coordinate axes.

DISCUSSION OF PRIOR ART

Milling and drilling machines of the type to which the present invention relates are designed for multiaxial machining of clamped workpieces and have the substantial advantage that, in addition to extremely high accuracy requirements, high cutting performances can be achieved at justifiable design- and control-related expenses.

From German patent publication 10 2004 034 873 B a generic milling and drilling machine is known which comprises a machine tool frame comprising a column-like base and two rigid side walls. The two side walls are connected by means of an upper crossbar to form an integrally formed portal. On the inclined face of the crossbar a slide is movable in horizontal guide rails and a machining unit including a work spindle is guided on the vertical face of the slide so as to be movable by means of a motor. The workpiece table is movable along a horizontal coordinate axis as far as under the crossbar on horizontal guide rails of a front end.

German patent publication 102 59 215 A1 discloses a milling and drilling machine which comprises a machine bed as well as two wall-like lateral stands. On the upper side of the two wall-like lateral stands a frame-like slide is arranged so as to be movable along Y and X axes by means of a motor. A machining unit is guided on the vertical face of the slide so as to be movable along the X and Z axes by means of a motor. Between the two wall-like lateral stands a workpiece table arrangement comprising a bridge rotatable about a horizontal axis is disposed. A plane table top comprising clamping means for clamping workpieces is provided on the central bridge laterally displaced with respect to the rotational axis.

SUMMARY OF THE INVENTION

It is a purpose of the present invention to provide a milling and drilling machine enabling versatile work with high positioning accuracies and high acceleration values in combination with a particularly advantageous chip fall.

A particular advantage of the milling and drilling machine according to some embodiments the invention is that the workpiece table arrangement is movable along the Y coordinate axis as far as under the crossbar of the portal-like machine tool frame on the horizontal, laterally spaced guide rails of the column-like base. A space exists in the column-like base between the two side walls to provide a particularly advantageous chip fall. Owing to the column-like base comprising the side walls, the upper crossbar and the front end on the front side, a monobloc-like overall structure fulfilling the highest stiffness requirements is preferably achieved.

To enable an effective accomplishment of a processing which is as versatile as possible while maintaining the required accuracy the frame of the machine according to embodiments the invention comprises a column-like base having two rigid side walls rigidly connected to each other by an upper cross girth and a front end on the front side. A slide movable on the cross girth in horizontal guides carries the machining unit formed as a milling head in front side vertical guides, the machining unit being movable in the vertical plane by means of a motor and comprising at least one exchangeable tool.

A particular advantage of this embodiment of the machine is that the workpiece table can be moved along one coordinate axis as far as the cross girth of the approximately portal-like stand on horizontal guides of the column-like base. Since a space is present between the two side walls in the column-like base a particularly advantageous chip fall is obtained.

To obtain the aspired high positioning accuracies and the sensitively controllable high accelerations, linear motors are conveniently used as drive units for the movements of the compound slide rest and the machining unit. The secondary parts of the linear motors respectively are preferably disposed between the guide rails provided in pairs. The primary parts of the electric linear motors are respectively preferably provided on the moving machine part.

According to an efficient embodiment of the invention horizontal guide rails are provided on the column-like base on the inner side adjacent to the two side walls of the machine tool frame. The guide rails extend up to the front end and serve as support for the workpiece table arrangement movable by means of a motor. The workpiece table arrangement according to the invention comprises two electrically synchronised linear motors the secondary parts of which are preferably mounted on the inner sides of the two side walls while their primary parts are preferably vertically mounted to components of the table arrangement.

Good visibility and accessibility of the workspace is achieved by providing the two side walls with steps on the front side, the front end having the same height as the front end portions of the two side walls and comprising a transverse front wall rigidly connected to the front end portions of the two side walls. In this way the front end and the side walls define a space in which a chip collector can be provided.

A workpiece table arrangement comprising a bridge pivotable about a horizontal axis of rotation by means of a motor and comprising a central bar laterally displaced with respect to the axis of rotation on which a plane table top comprising clamping means for clamping workpieces is disposed is particularly suitable for the milling and drilling machine according to the invention. The vertical bearing legs connected to both ends of the central bar of the bridge are rotatably supported in a slide, respectively, the two slides supporting the bridge comprising guiding shoes as well as drive units for synchronous driving motions of both slides and further drive units for the pivoting movements of the bridge.

Conveniently electrically synchronised torque motors serving as swivel drives for the bridge as well as electrically synchronised linear motors for the shifting movements of the two slides are provided in the slides. The plane table top rotatably supported in the central bar of the bridge is conveniently also rotatably driven by a torque motor disposed in the bridge. The torque motors used may generate high torques even in case of relatively low speeds and will yield high positioning accuracies of the driven components.

BRIEF DESCRIPTION OF THE DRAWING

The features, benefits, and advantages of the invention will be more readily perceived from the following detailed description, when read in conjunction with the accompanying drawing, in which.

DETAILED DESCRIPTION OF THE PREFERRED EMBODIMENTS

Figure 1:
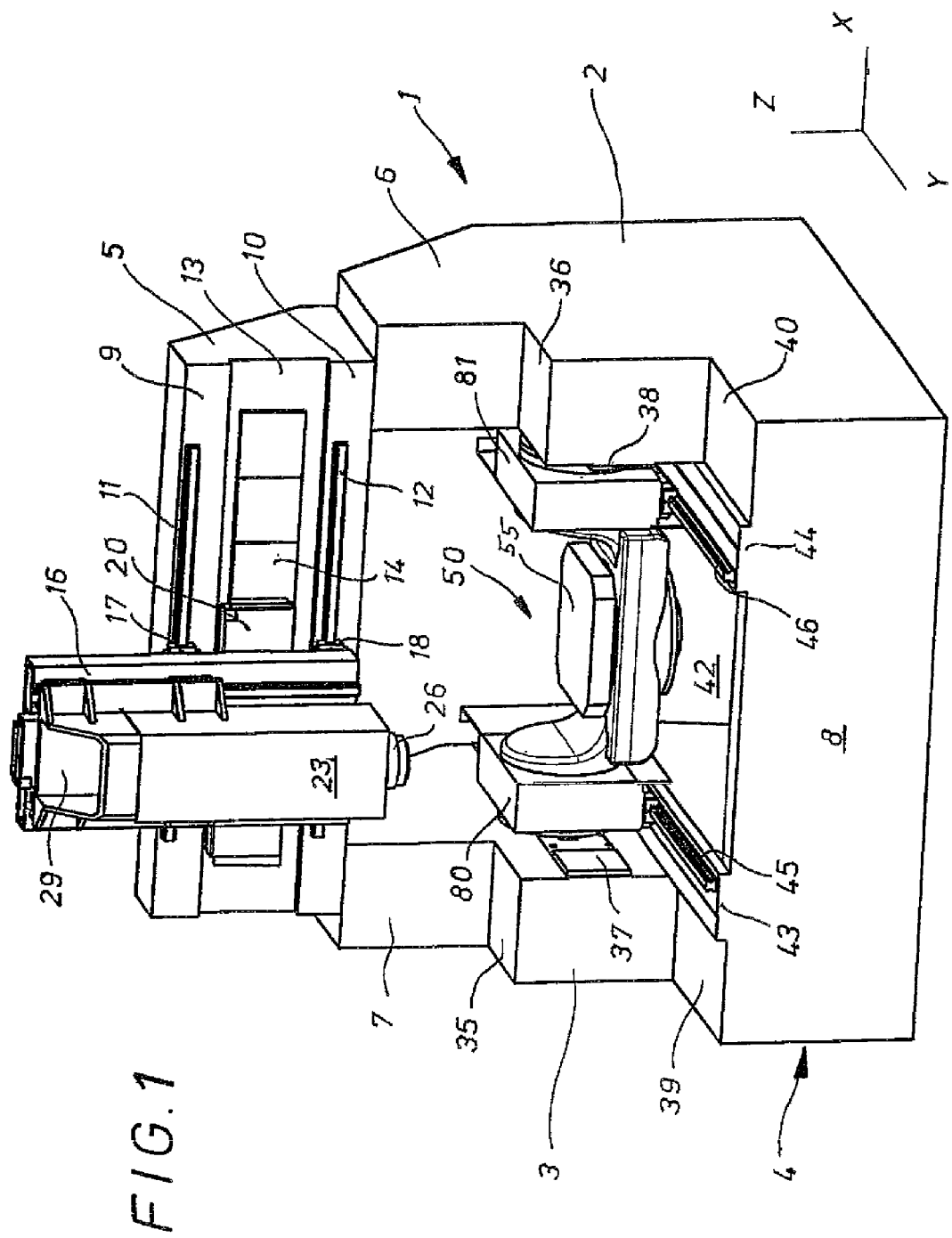
FIG. 1 is a perspective overall view of a milling and drilling machine according to an embodiment of the invention.
Figure 2:
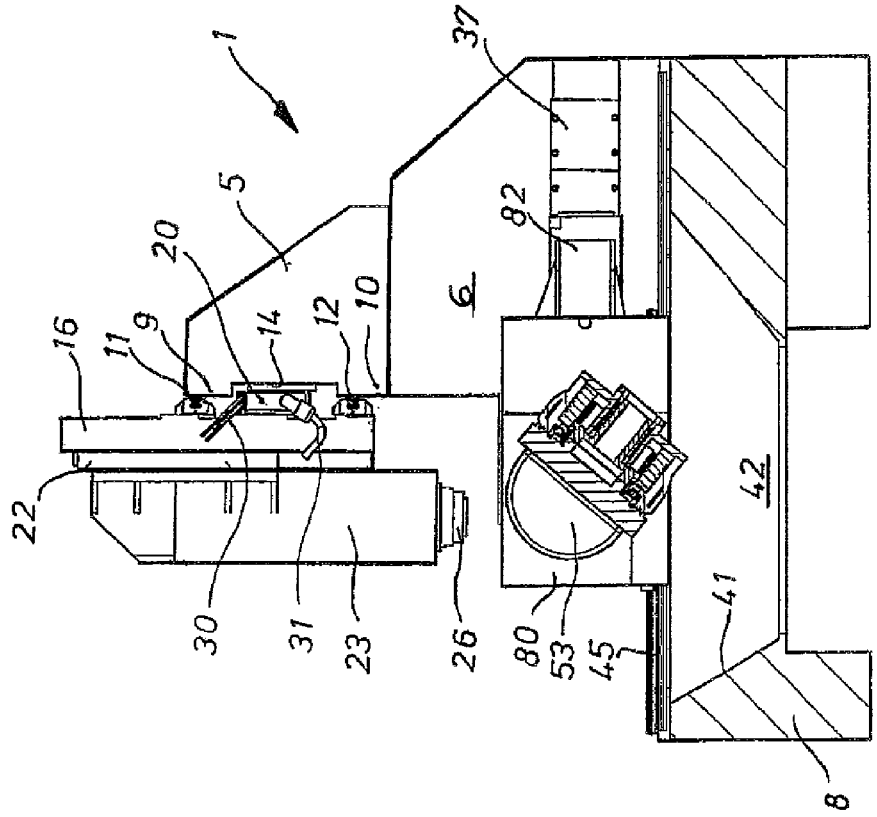
FIG. 2 is a partially cross sectional front view of the milling and drilling machine according to FIG. 1.
Figure 3:
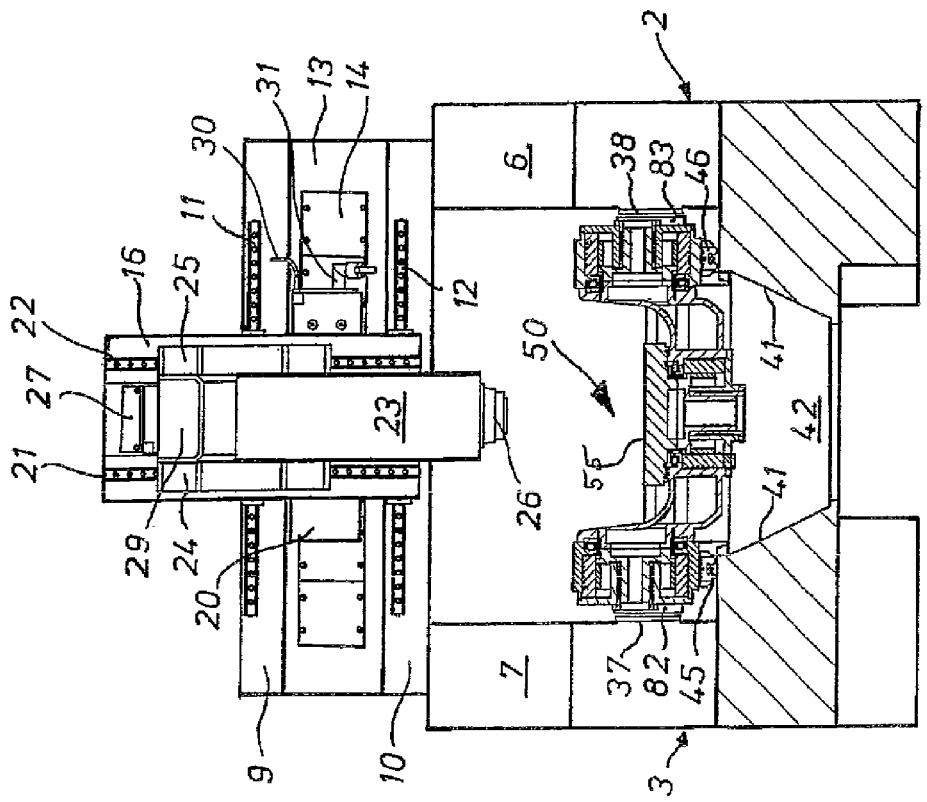
FIG. 3 is a partially cross sectional side view of the milling and drilling machine according to FIG. 1.

The milling and drilling machine shown in FIGS. 1 to 3 comprises a highly rigid machine tool frame 1 comprising two generally parallel side walls 2, 3, a front end 4 on the front side as well as an upper crossbar 5 fixed to upper rear portions 6, 7 of side walls 2, 3. Side walls 2, 3 and front end 4, including transverse front wall 8, are conveniently formed as a monobloc construction. However, such monobloc construction is not essential to the invention. As may be seen particularly in FIGS. 1 and 3, crossbar 5 has a downwardly expanding trapezoidal cross section with a vertical front side and an inclined rear wall. The broader bottom side of crossbar 5 is permanently fixed on the horizontal upper surface of upper rear portions 6, 7 of side walls 2, 3. On its front side, crossbar 5 is provided with upper and a lower bar-like protrusions 9, 10, on which guide rails 11, 12, respectively, are mounted. In recessed central portion 13 of crossbar 5 between protrusions 9, 10, plate-like secondary parts 14 of an electric linear motor are fixed in a row and adjacent to each other.

On front side guide rails 11, 12 of crossbar 5, support slide 16 is guided in guiding shoes 17, 18 so as to be horizontally movable. A primary part 20 of the electric linear motor cooperates with secondary parts 14 and is mounted to the rear side of support slide 16. To the front side of the support slide are attached two parallel vertical guide rails 21, 22, on which a spindle housing headstock 23 is guided via guiding shoes 24, 25, respectively provided in pairs so as to be vertically shiftable. Headstock 23 contains work spindle 26 directly driven by an integral electric motor (not shown). An electric linear motor has plate-like secondary parts 27 mounted on the front side of slide 16 between guide rails 21, 22, and serves as a drive for moving the machining unit comprising headstock 23 and work spindle 26. The primary part of the electric linear motor cooperating with secondary parts 27 and provided for the vertical movements of headstock 23 is located on the rear side of support construction 29 of the headstock.

As can be seen in FIGS. 2 and 3, electrical supply cables 30 as well as cooling liquid lines 31 are provided for the electric linear motors. As can be seen in FIG. 1 side walls 2, 3 are provided with respective steps 35, 36 located between upper rear portions 6, 7 and front end 4 in their central region. As can be seen in the left portion of FIG. 1 and in FIG. 2, plate-like, stationary secondary parts 37, 38 of electric linear motors are mounted in side walls 2, 3 in the areas of steps 35, 36.

Spaced lower front end portions 39, 40 of side walls 2, 3 have about the same height as transverse front wall 8 of front end 4 and define space 42 used as a chip collector via inclined surfaces 41.

As can be seen in FIG. 1, bar-shaped supports 43, 44 extend on front end 4 along the inner side of side walls 2, 3. On each support 43, 44 is mounted guide rail 45, 46, respectively, extending up to the rear end of the machine tool frame 1 (see FIG. 3).

On guide rails 45, 46 table arrangement 50 is movably guided which is provided with a central support portion and two lateral primary parts 82, 83 of linear motors in the embodiment shown. Primary parts 82, 83 cooperate with stationary secondary parts 37, 38 in side walls 2, 3 of machine tool frame 1 and effect shifting movements of table arrangement 50 on guide rails 45, 46 fixedly mounted on the frame. The central support portion of the table arrangement may support a rotatable or non-rotating table top 55 for clamping one or more workpieces.

Figure 4:
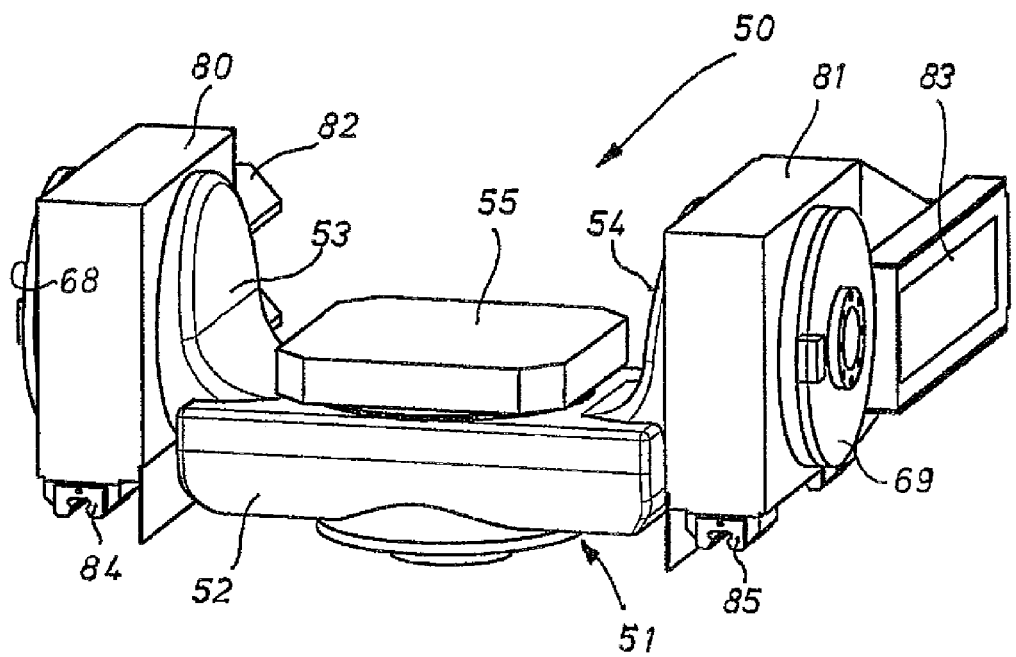
FIG. 4 is a perspective view of a workpiece table arrangement for the embodiment shown in FIGS. 1 to 3.
Figure 5:
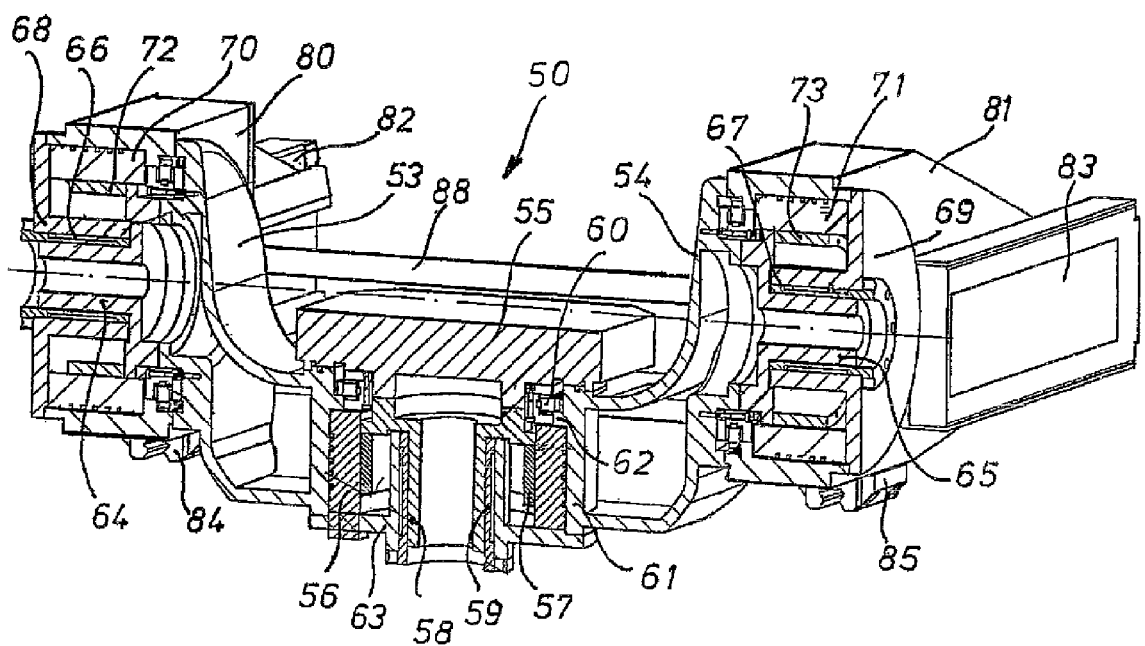
FIG. 5 is a vertical cross sectional view of the workpiece table arrangement according to FIG. 4.

In the embodiment of the machine tool shown in FIGS. 1 to 3, a specific workpiece table arrangement 50 is used which is shown in detail in FIGS. 4 and 5. Table arrangement 50 comprises bridge 51 consisting of rigid central bar 52 and two laterally upwardly extending leg portions 53, 54. In central bar 52 workpiece table 55 is supported which is provided with parallel clamping grooves (not shown) for clamping one or more workpieces on its surface. The workpiece table is rotationally driven by a torque motor Stator 56 of the torque motor is provided with cooling channels and is mounted in a cylindrical recess in central bar 52. Rotor 57 of the torque motor is a so-called internal rotor and fixedly connected to hollow bearing journal 58 via a flange. For arresting the workpiece table in predetermined rotational positions clamping jack 59 is provided which engages the jacket surface of bearing journal 58 when a pressure means is applied to its elongated narrow ring chamber. For a non-tilting support of workpiece table 55, ring-shaped axial/radial bearings 60 are provided which bring about a high load-bearing capacity and a free movement of the workpiece table. The torque motor is capable of generating high torques as well as high speeds so that even larger workpieces can be machined with high accuracy by milling as well as by turning in one setting. In the embodiment shown, leg portions 53, 54 which are laterally bent-up to a vertical posture, are configured with double walls and integrally formed with support cylinder 61 for torque motor 56, 57. As can be seen in FIG. 5, support cylinder 61 surrounds hollow cylindrical stator 56, which is provided with helical grooves on its outer circumference. The helical grooves in stator 56 form cooling channels supplied with a cooling medium in a known manner. The upper face of hollow cylindrical stator 56 is supported by ring collar 62 formed on or attached to support cylinder 61 directly below ring-shaped axial/radial bearing 60. Owing to this arrangement the loads acting on the bearing are directly applied to stable support cylinder 61. On the bottom side support cylinder 61 and stator 56 together with other components terminate in an integrally formed cover 63 comprising a sleeve coaxial with stator 56 as well as a radial flange attached to it.

In table arrangement 50 according to FIGS. 4, 5, hollow support bearing journal 64, 65 is attached to the lateral flank of each of leg portions 53, 54, respectively. The center axes of support bearing journals 64, 65 coincide and form a common swivel axis for bridge 52 and the workpiece table. The swivel axis extends a predetermined distance from the surface of workpiece table 55. On each support bearing journal 64, 65 a respective clamping jack 66, 67 is provided which comprises a wall deformable radially inwardly by means of a pressurized fluid for clamping support bearing journal 64 or 65, respectively. Each clamping jack 66, 67 is fastened in a sleeve which is part of a circular cover 68, 69.

Each support bearing journal 64, 65 is driven by a torque motor, respectively, the two torque motors preferably being electrically synchronised. Each torque motor comprises a respective outer stator 70, 71 which is provided with circumferential cooling channels mounted in a cylindrical recess of a housing of slide 80, 81 and supported by the disk-shaped part of cover 68, 69 on the front side. A rotor 72, 73 cooperates with respective stator 70, 71 as an internal rotor, respectively. Each rotor 72, 73 is fixedly connected to the associated leg 53 or 54 of table arrangement 50 via suitable retaining means and prompts the pivoting movements of the workpiece table into desired angular positions before or during workpiece machining when synchronised torque motors 70, 72 and 71, 73 are electrically excited. In the embodiment shown each ring-shaped rotor 72, 73 is shorter than the respectively associated stator 70, 71 and is attached to an inner radial flange of support bearing journal 64, 65 with its axially inner face.

The supports of table arrangement 50 described above are accommodated in a housing of slide 80, 81, respectively. On the rear portion of each slide 80, 81 a movable primary part 82, 83 of an electrical linear motor is provided. Stationary secondary part 37, 38 of the electric linear motors is disposed on the inner side of respective side wall 2, 3 of machine tool frame 1, as can be seen in FIGS. 1 and 3. On its bottom side each slide 80, 81 is provided with guiding shoes 84, 85 cooperating with guide rails 45, 46, as shown in FIG. 2.

The invention is not limited to the embodiments shown and described above. For example, other table arrangements may be used in the milling and drilling machine according to the invention. Conveniently these designs should comprise slide-like components in which, where applicable, a rigid table structure is mounted. Such slide-like components should be provided with the functional part of an electric linear motor on an outer sidewall while the other functional part of the motor should be provided on the inner side of the side wall of the machine tool frame.

What is claimed is:

1. A milling and drilling machine comprising:
    a rigid machine tool frame comprising two generally parallel side walls having inner sides and front end portions, and an upper crossbar attached to said side walls;
    a machining unit movable on said upper crossbar along at least two coordinate axes and including a rotationally driven work spindle configured to engage exchangeable tools;
    a front end comprising the front of said machine tool frame and having horizontal guide rails mounted on said front end;
    a workpiece table arrangement comprising a table top for clamping a workpiece, said workpiece table arrangement being disposed on said horizontal guide rails so as to be movable in a Y coordinate axis;
    elongated supports on said front end are provided on which said guide rails for said workpiece table arrangement are mounted, said supports being adjacent to said inner sides of said side walls of said machine tool frame; and
    two electrically synchronized linear motors provide the drive for the shifting movements of said workpiece table arrangement along the Y coordinate axis, said motors having secondary and primary parts, the secondary parts of said motors being attached to said inner sides of said side walls of said machine tool frame, the primary parts of said motors being vertically mounted to said workpiece table arrangement.

2. The milling and drilling machine according to claim 1, and further comprising:
    horizontal guide rails mounted on said crossbar; and
    a slide movable along said horizontal guide rails, said slide having vertical guide rails on the front side thereof said machining unit being formed as a milling head being movable on said vertical guide rails.

3. The milling and drilling machine according to claim 2, and further comprising drive units for said slide and said machining unit, said drive units comprising electric linear motors, secondary parts of which are respectively disposed between said guide rails.

4. The milling and drilling machine according to claim 1, wherein said two side walls of said machine tool frame each comprise a front side step.

5. The milling and drilling machine according to claim 1, and further comprising a chip collector free space defined by said front end and said side walls.

6. The milling and drilling machine according to claim 1, wherein said front end comprises a transverse front wall rigidly connected to said two side walls of said machine tool frame and having substantially the same height as said front end portions of said two side walls.

* * * * *